(12) United States Patent
Millar et al.

(10) Patent No.: US 9,843,903 B2
(45) Date of Patent: Dec. 12, 2017

(54) METHOD AND APPARATUS FOR MOBILE DEVICE LOCALIZATION

(71) Applicant: Pelco, Inc., Clovis, CA (US)

(72) Inventors: James G. Millar, Clovis, CA (US); Barry Jon Velasquez, Clovis, CA (US)

(73) Assignee: Pelco, Inc., Clovis, CA (US)

( * ) Notice: Subject to any disclaimer, the term of this patent is extended or adjusted under 35 U.S.C. 154(b) by 0 days.

(21) Appl. No.: 13/841,202

(22) Filed: Mar. 15, 2013

(65) Prior Publication Data
US 2014/0274120 A1  Sep. 18, 2014

(51) Int. Cl.
 *H04W 4/04*  (2009.01)
(52) U.S. Cl.
 CPC .................... *H04W 4/043* (2013.01)
(58) Field of Classification Search
 CPC ......... H04W 4/02; H04W 4/043; H04W 4/04; G01S 1/72; G01S 5/00; G01S 5/0009; G01S 5/0045
 USPC ........... 455/456.1, 456.6, 456.3; 340/539.13; 367/118
 See application file for complete search history.

(56) References Cited

U.S. PATENT DOCUMENTS

| | | | |
|---|---|---|---|
| 6,900,762 B2 * | 5/2005 | Andrews ............... | G01S 5/0036 342/386 |
| 8,457,502 B2 | 6/2013 | Ryan et al. | |
| 8,497,935 B2 * | 7/2013 | Swarr ................... | H04N 5/2251 348/211.1 |
| 2008/0089255 A1* | 4/2008 | Graves et al. ................. | 370/310 |
| 2008/0095401 A1* | 4/2008 | Saleh et al. .................... | 382/103 |
| 2010/0109864 A1* | 5/2010 | Haartsen ............... | G01C 21/206 340/539.13 |
| 2010/0150079 A1* | 6/2010 | Maltsev .................... | H04L 1/06 370/329 |
| 2012/0115512 A1* | 5/2012 | Grainger et al. .......... | 455/456.3 |
| 2012/0133555 A1* | 5/2012 | Hyun .................... | G01S 5/0236 342/357.31 |
| 2012/0263020 A1 | 10/2012 | Taylor et al. | |
| 2014/0043943 A1* | 2/2014 | Lavery .......................... | 367/118 |
| 2014/0135038 A1* | 5/2014 | Shapira .................. | G01S 19/48 455/456.3 |

OTHER PUBLICATIONS

Borriello, G., et al., "Walrus: Wireless Acoustic Location with Room-Level Resolution using Ultrasound," *Proceedings of the 3rd International Conference on Mobile Systems, Applications, and Services*, Jun. 6-8, 2005, Retrieved on Jan. 14, 2013 from the Internet URL: http://static.usenix.org/event/mobisys05/tech/full_papers/borriello/borriello_html/.

* cited by examiner

*Primary Examiner* — Marisol Figueroa
(74) *Attorney, Agent, or Firm* — Locke Lord LLP (57) ABSTRACT

Because GPS does not work indoors, mobile electronics devices that use GPS for activities do not work inside a building. An embodiment of the present invention uses ultrasonic tone generators in each room. The ultrasonic tone generators can be built into cameras or separate devices. Each device may emit a unique tone that has a high enough frequency that most people cannot hear the frequency or combination of frequencies. Using a built-in microphone on a mobile device, the incoming audio may be analyzed in the frequency domain to determine the loudest tone above the human hearing threshold. This tone may be mapped to a specific room that can then be sent to the mobile electronics device to perform any location-aware actions.

15 Claims, 7 Drawing Sheets

TABLE OF CORRESPONDENCES

| ROOM | TONE 1 (20,000) | TONE 2 (20,250) | TONE 3 (20,500) | TONE 4 (20,750) | TONE 5 (21,000) | TONE 6 (21,250) | TONE 7 (21,500) | TONE 8 (21,750) Hz |
|---|---|---|---|---|---|---|---|---|
| 1A1 | ON | ON | OFF | OFF | ON | OFF | OFF | OFF |
| 1A2 | ON | OFF | ON | OFF | ON | OFF | ON | OFF |
| 1A3 | | | | | | | | |
| ... | | | | | | | | |
| 1An | | | | | | | | |
| 2A1 | | | | | | | | |
| 2A2 | | | | | | | | |
| 2A3 | | | | | | | | |
| ... | | | | | | | | |
| 2An | | | | | | | | |
| ... | | | | | | | | |
| 1B1 | | | | | | | | |
| 1B2 | | | | | | | | |
| 1B3 | | | | | | | | |
| ... | | | | | | | | |
| 1Bn | | | | | | | | |
| ... | | | | | | | | |

METHOD AND APPARATUS FOR MOBILE DEVICE LOCALIZATION

BACKGROUND OF THE INVENTION

Global positioning system (GPS) devices have become useful for many activities. Global positioning systems work through use of signals received from satellites transmitting global positioning system signals. GPS signals tend not to be available indoors, so GPS devices cannot determine GPS coordinates.

SUMMARY OF THE INVENTION

An embodiment of the invention is a method or corresponding apparatus or system of providing indoor localization. The method comprises emitting signals at multiple fixed locations within an indoor facility. These signals are unique at each location relative to the signals at adjacent locations.

Optionally, the signals are unique at every location of the multiple fixed locations within the indoor facility.

The method may include emitting signals that are human-imperceptible signals. Emitting the human-imperceptible signals may include emitting ultrasonic signals. Alternatively, emitting the human-imperceptible signals may include emitting signals at non-visible optical wavelengths.

Emitting the signals may alternatively include emitting signals perceptible by a mobile electronics device. In such a case, emitting the signals may include emitting signals encoded to match a location within a facility known to the mobile electronics device by way of a look-up table.

Emitting the signals may include emitting multiple tones (i.e., frequencies) at or above 20 kHz separated by at least 250 Hz and at or below 40 kHz at each location within the indoor facility. The combination of tones at each location may be different from the combination of tones at each other location. The combination of tones at adjacent locations may be sufficiently distinguishable that cross-talk between signals at adjacent locations does not negatively impact the mobile electronics device from identifying its present location.

Emitting the signals may further include emitting a composite of multiple signals of different frequencies without modulation or emitting a composite of multiple signals of different frequencies with modulation on at least one of the frequencies. In another embodiment, emitting the signals includes emitting a single frequency having a unique modulation at a given location relative to signals at adjacent locations.

The method may further comprise transmitting a mapping of the signals corresponding to the multiple fixed locations to a mobile electronics device for the mobile device's use in determining its location based on signals it senses at a location.

The indoor facility may be a building with multiple floors and multiple rooms, such as offices, on each floor. In the building, the emitting of the signals may include emitting signals encoded according to a three-dimensional grid corresponding to floors and rooms on each floor.

Another embodiment of the present invention includes a system for providing indoor localization. The system may include a controller having access to a mapping of multiple fixed locations within an indoor facility. The mapping may include parameters for signals to be emitted at the multiple fixed locations, where the parameters may be unique for each location relative to parameters at adjacent locations or unique with respect to all other locations. The system further includes a signal generator at each location configured to generate a signal corresponding to a respective parameter. The system still further includes an emitter at each location coupled to the respective signal generator and configured to emit a signal according to the respective parameter, with the signals at the multiple fixed locations within the indoor facility being unique at each location relative to signals at adjacent or all other locations. The system may include additional elements that can be configured to perform operations consistent with the above-described method.

Another embodiment of the present invention includes a mobile electronics device. The mobile electronic device comprises a transducer and a receiver coupled to the transducer, with the receiver being configured to convert a signal sensed by the transducer at a location, among multiple fixed locations in an indoor facility, into a representation of the signal. The representation is unique for the location relative to a representation at an adjacent location. The mobile electronics device further includes a mapping module configured to convert the representation of the signal into a corresponding indication of the location at which the transducer sensed the signal, with the indication being correspondingly unique relative to indications of adjacent locations in the indoor facility.

The mobile device may also include a noise reduction module in the receiver to reduce noise associated with the signal sensed by the transducer. In another embodiment, the receiver may include a Doppler compensation module to reduce effects of Doppler caused by movement of the mobile electronics device, particularly in the indoor facility that includes multi-path effects.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
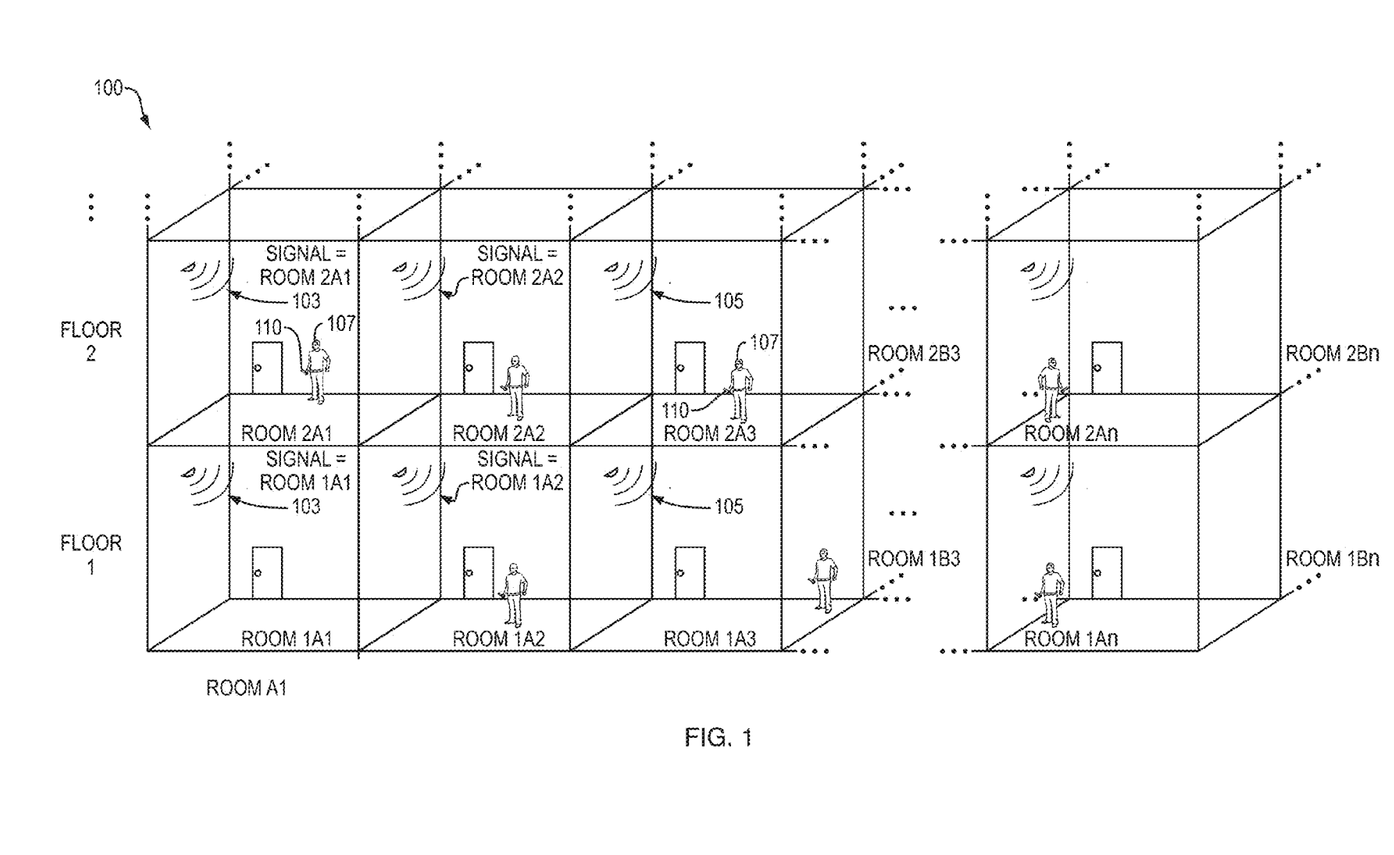
FIG. 1 is a diagram of an indoor environment, such as a multi-story building, that may employ an embodiment of the present invention.

FIG. 1 is a diagram of an indoor facility (also referred to herein as a building) 100, such as a multi-story building, in which an embodiment of the present invention may be employed. Each room in the building 100 includes an emitter 105 that generates a signal 103 that is unique from other signals in other rooms. The building has multiple floors, floor 1, floor 2, and so forth, and multiple rooms within the floors, such as floor 1, room A1 ("room A1"), floor 1, room A2 ("room A2"), ..., floor 1, room A3, floor 2, room A1 ("room 2A1"), and so forth.

The emitters 105 transmit the signals 103 into the mobile electronics device 110 rooms, and a person 107 with a mobile electronics device 110, such as a mobile phone, can receive the signals while in the room. With the proper processing of the signals 103, the mobile electronics device 110 can determine the specific location within the building the person 107 is standing.

In a particular embodiment, each room has an audio speaker (i.e., the emitter 105) installed that is capable of emitting a combination of high frequency tones (such as in the 20 kHz range). The audio speakers 105 have relatively low distortion in order to prevent audible intermodulation distortion that can occur when two or more high frequency tones are played from the same audio speaker.

Using existing hardware on a mobile device, the mobile electronics device can determine the location at "room (or, more generally, location) resolution" by detecting combinations of high frequency tones in the room being served by the emitters 105. Soundwaves, especially high-frequency sound waves, do not travel well through solid walls or around corners, so the tones (i.e., signals 103) in the rooms are significantly louder than tones from neighboring rooms in most situations.

In some embodiments, processing in the mobile electronics devices 110 can detect the most prominent tones in the room simply by extracting peak values of the power spectrum, as provided, for example, by a Fast Fourier Transform (FFT). Because of multipath effects caused by room acoustics, Doppler effects caused by movement of the mobile electronics device 110, and general noise within the room, the mobile electronic device 110 can get a more accurate reading by integrating the FFT power spectrum over time, which greatly reduces the effect of those problems and gives a more clear reading of which tones are present in the room. This integration only needs to take place over a few seconds. The integration also prevents "bouncing" and confusion when the mobile electronic device 110 transitions from one room to another.

In a particular example, a total of eight different tones can be used as a type of binary indicator of which room the device is currently located. The tones may be separated by at least 250 Hz, or less if appropriate processing is available in the mobile electronics device 110, as well as being transmitted by emitters and receivers that can perform with sufficient signal separation. With eight different possible tones, a system can treat the tones as a simple eight-bit binary signature, resulting in a possibility of up to 256 different rooms using a bandwidth of 2 kHz (e.g., 20 kHz-22 kHz). Each room may play a different combination of tones. For example, room 1A1 might play tones 20,000, 20,250, and 21,000 Hz, while room 1A2 plays tones 20,000, 20,500, 21,000, and 21,500 Hz.

After the mobile electronic device 110 detects which tones are being played in the room, the device 110 can refer to a simple look-up table (not shown) either built into the device 110 or accessible from a server via a network (not shown) to which the device 110 can connect. In this way, the device will know which room it is in or tell a server which room it is in, whichever is more useful to the user and the system.

Continuing to refer to FIG. 1, although some embodiments may use ultrasonic wavelengths or frequencies, such as 20 kHz to 40 kHz, or a small range therein, such as 20 kHz-22 kHz, or other range suitable for servicing an entire building while not disrupting flow of human activity except possibly in an emergency situation (i.e., using frequencies within an audio range of most people, such as between 1 kHz and 15 kHz, it should be understood that other forms of signals, such as non-visible optical wavelengths (e.g., infrared wavelengths) may alternatively be used if the mobile electronics device is equipped to receive such wavelengths.

Although the signals 103 may be perceptible by a mobile electronic device 110, the signals 103 may also be used for security purposes, such as to ensure a computer stays in a given room and does not transfer between rooms. Various techniques may be used to determine the location in which the mobile or stationary electronics devices is, such as through use of a look-up table or calculating a location encoded in the signals 103, or accessing information corresponding to the received signals 103 through use of a network and a remote server (not shown).

Examples of various signals 103 are described below in reference to FIGS. 6A and 6B. In cases in which a look-up table is used by the mobile electronics device 110, the mobile electronics device 110 may be configured with the look-up table by a service provider, or the mobile device 110 may obtain the look-up table on a permanent or temporary basis as the mobile device 110 enters the building 100. The look-up table may be represented as a three-dimensional grid corresponding to floors and rooms on each floor within the building 100.

Figure 2:
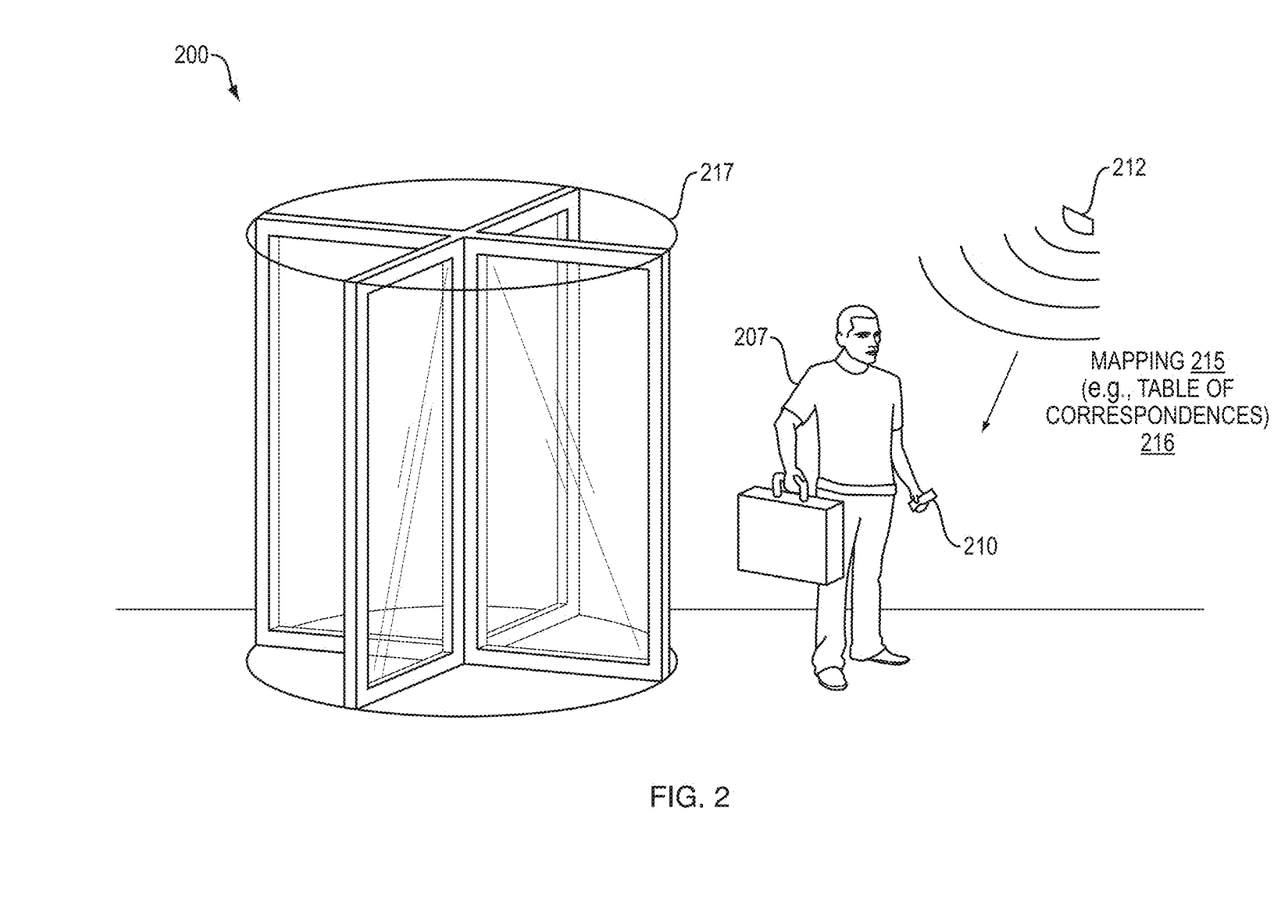
FIG. 2 is a diagram of an entrance way to an indoor environment at which a mobile electronics device receives a mapping, such as a table of correspondences, that maps signals, which the mobile electronics device will receive in the indoor environment, to locations within the indoor environment.

FIG. 2 illustrates a person 207 with a mobile electronics device 210, such as a mobile phone, entering a building 200 via a rotating door 217. A transmitter 212 transmits a mapping 215 that includes information, such as a table of correspondences, so that the mobile device 210 can convert sensed signals (e.g., signals 103 of FIG. 1) into an indication of a location within the building 200. The mapping 215 may be simple data that can work within other applications within the mobile electronics device 210 or may be a self-operating app (i.e., application configured to operate on a smart phone) that self-configures on the mobile electronics device. The mapping 215 or corresponding app may timeout after a certain period of time or after some length of time the mobile electronics device 210 is no longer within range of any of the signals providing locations within the building 200. Alternatively, the transmitter 212 or a transmitter outside the building (not shown) may cause the app to solve-terminate for security purposes.

Figure 3:
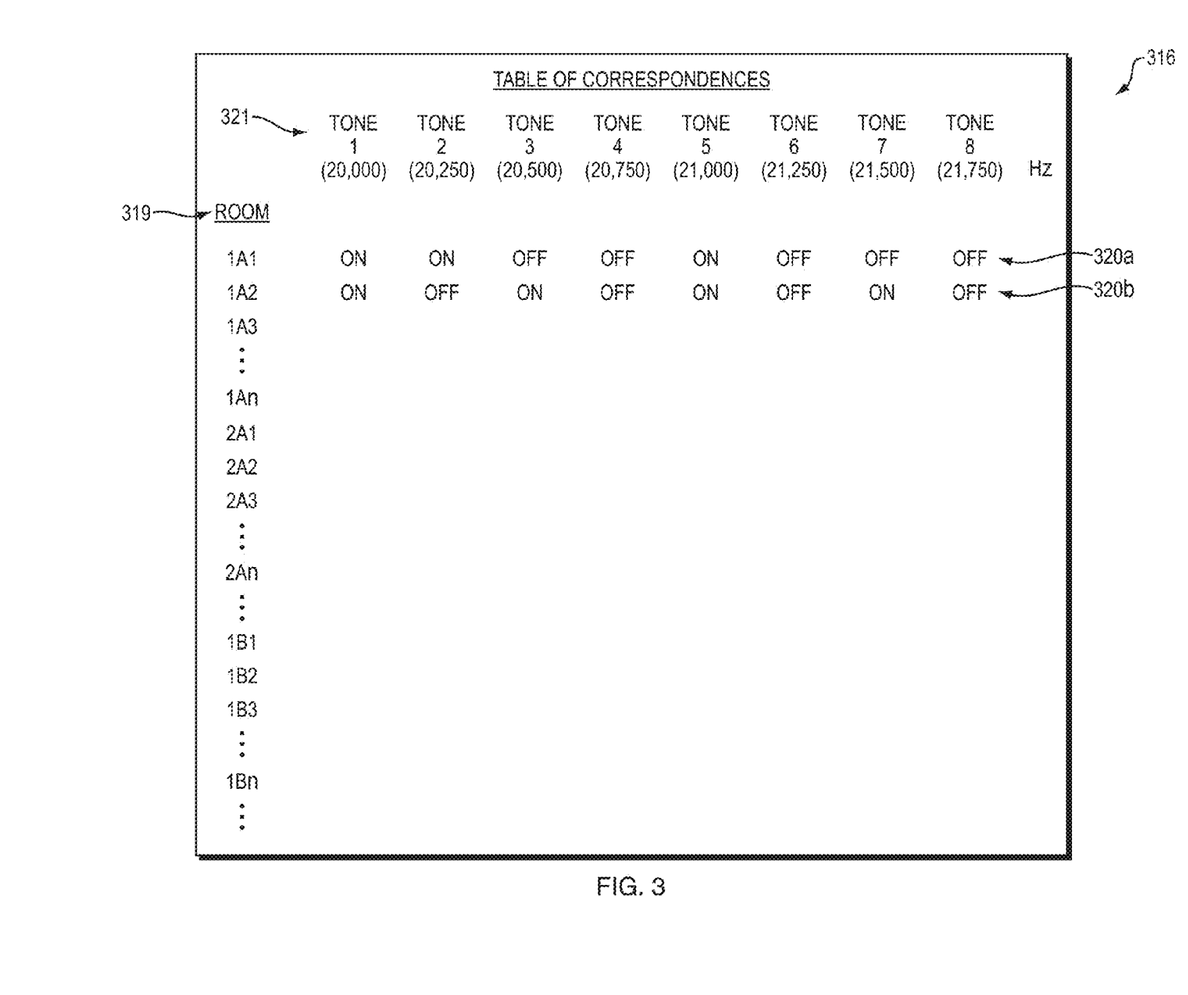
FIG. 3 is a table of correspondences illustrating room numbers and tones, such as ultrasonic tones, that can be used to distinguish rooms from each other according to a pattern of the tones.

FIG. 3 is a table 316 that illustrates correspondences between rooms 319 and tones 321. In the example table of correspondences 316, there are eight tones ranging from 20 kHz to 21.75 kHz, separated by 250 Hz. The rooms 319 may have an emitter (e.g., audio speaker) that can emit the frequencies with sufficient fidelity that a transducer/receiver in an electronic device, such as a mobile electronics device, can accurately receive the frequencies and perform processing to make a determination as to which room the electronics device is currently located.

In the example table correspondences 316, a first row 320a indicates that a signal generator/emitter pair in room 1A1 has three frequencies turned ON, namely tones 1 (200 kHz), tone 2 (20.25 kHz), and tone 5 (21.0 kHz), while all others are OFF. In the next row 320b, for room 12A, tones 1, 3, 5, and 7 are ON. For the remainder of the rooms, a building manager can configure a controller to cause a signal generator to generate signals that cause the emitter to emit the frequencies of the respective tones such that each room is unique from each other room. Alternatively, there may be reuse of frequencies, but it may be useful that rooms are separated enough in terms of their audio frequencies such that there is little to no crosstalk between adjacent rooms so that the mobile electronics devices or other electronics devices can distinguish their locations effectively.

Figure 4:
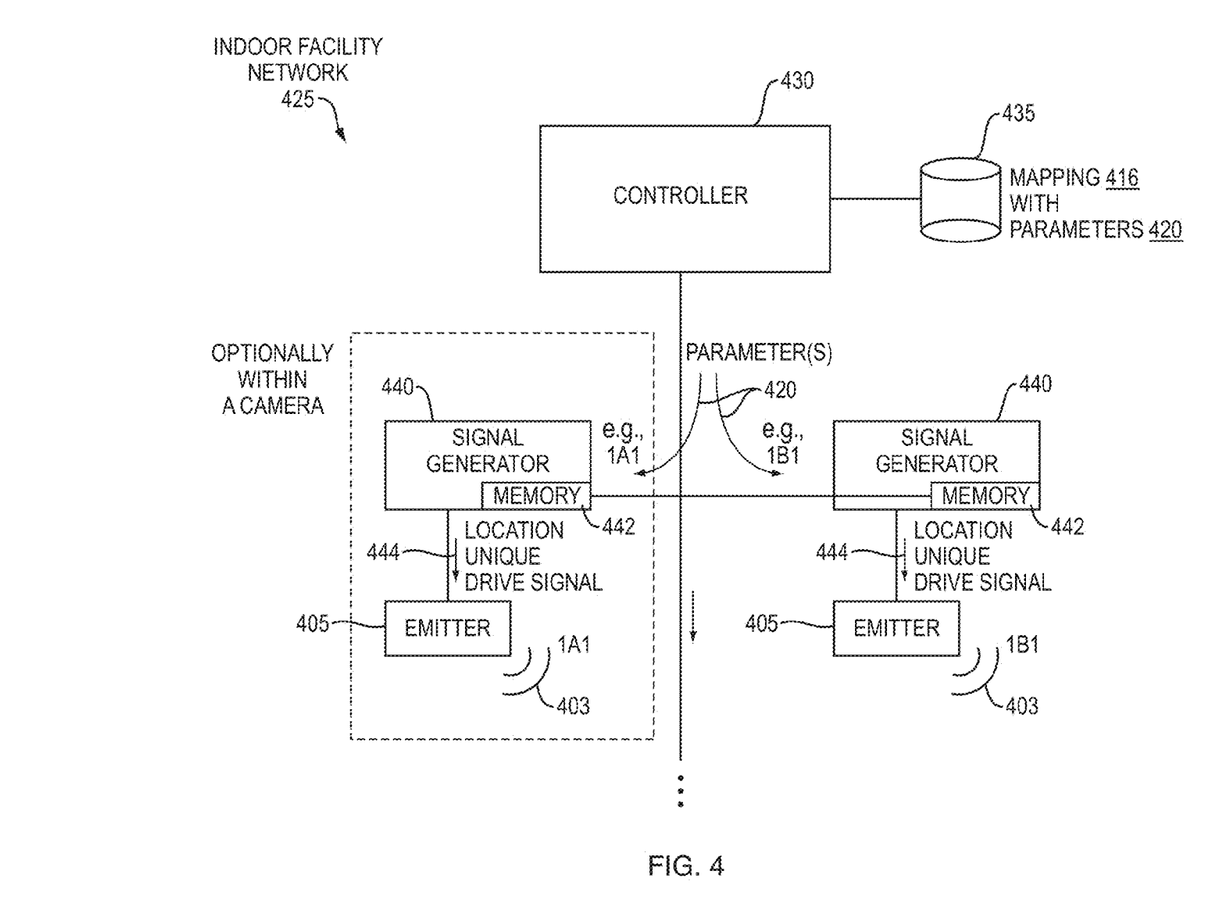
FIG. 4 is a network diagram of an indoor facility network.

FIG. 4 is a block diagram of an indoor facility network 425. The network 425 includes a controller 430, data storage 435 that stores a mapping 416 with parameters 420. The mapping may include parameters that can be used by a signal generator 442 that generates a location-unique drive signal 444 that causes an emitter 405 to produce a unique signal 403 for a particular room, such as room 1A1 with respect to, for example, an adjacent room, such as room 1A2 or 1B1 (FIG. 1). The parameters 420 may be stored in a memory 442 that the signal generator 440 uses until receiving different parameters or otherwise programmed.

The controller 430 may be accessible to a facility manager to reconfigure the network such that improved performance by mobile electronics devices is achieved. For example, if mobile electronics devices (not shown) find that there is ambiguity between two rooms as a result of having signals in adjacent rooms (or hallways) too close in frequencies, specifically the frequencies or modulated frequencies emitted composing the signals within the rooms are too similar to those by adjacent emitters, then the facilities manager can simply change the mapping 416 by way of changing the parameters for 420, such as via a computer interface (not shown) operatively coupled to the controller 430. It should be understood that the parameters can be in the form of signal parameters, such as frequency, amplitude modulation, frequency modulation, or other forms of modulation that can be used to cause the emitter to vary a signal parameter that can be sensed by a transducer on a mobile device to determine location within a building.

The indoor facility network 425 is merely an example of a network. It should be understood that the signal generator 440 and emitter 405 may be in a standalone box mounted on a wall, configured in light fixtures, positioned in surveillance cameras, or otherwise made available for positioning in a fixed location in the building. It should be understood also that the term "fixed location" may mean that the emitter is mounted securely to a wall or fixture or that the emitter 405 is simply placed in a room, such as connected to an external port to a computer bus (e.g., USB port) that does not change its position relative to the structure of the indoor facility. In an event the signal generator/emitter is moved from one room to another and causes reduced system performance, the facility manager can simply modify the parameters 420 in the data storage 435, as previously described.

Figure 5:
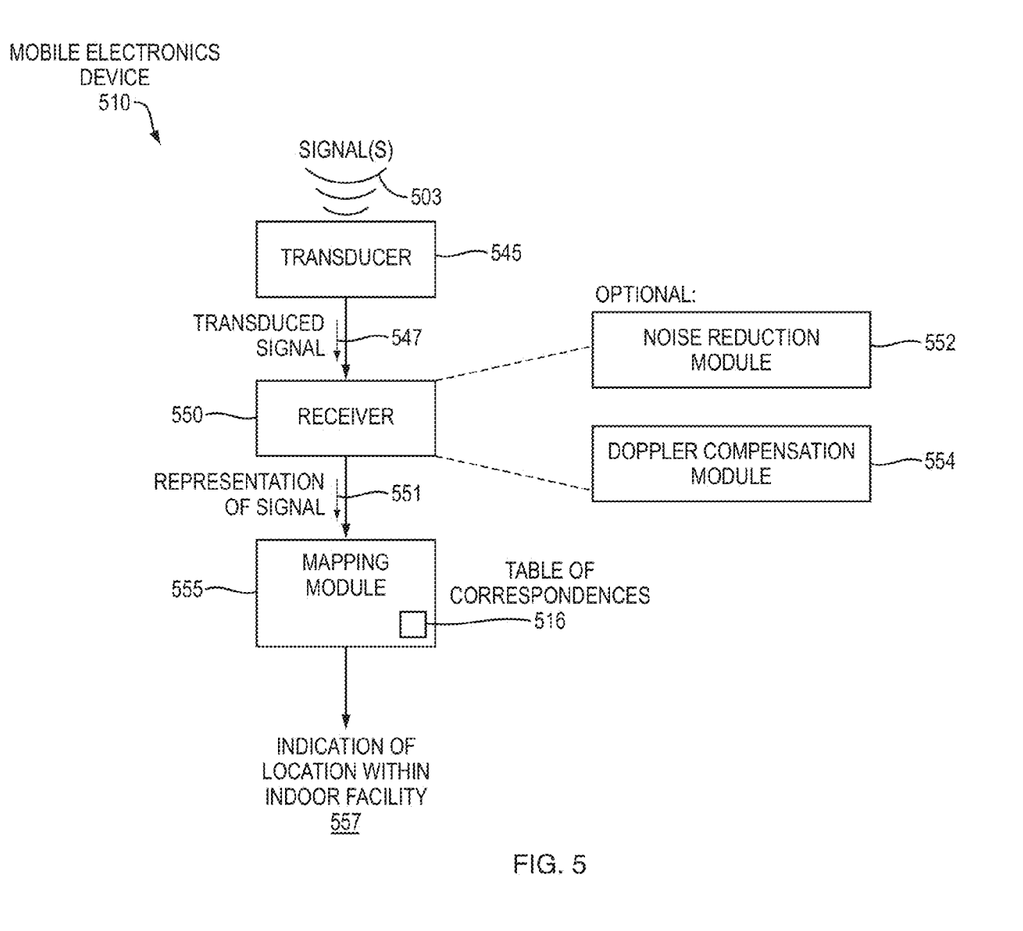
FIG. 5 is a schematic diagram of a mobile electronics device according to an embodiment of the present invention.

FIG. 5 is a block diagram of a mobile electronics device 510. The mobile electronics device 510 includes a transducer 545 configured to receive signals 503 from the emitters, such as the emitter 400 and 405 of FIG. 4. The transducer 545 may be a standard microphone found in all mobile phones, so long as the microphone can sense and distinguish frequencies emitted by the emitters with the frequency spacing, as provided in some embodiments. For example, in the case of ultrasonic emitters, the standard microphones of mobile phones must be able to sense frequencies in the 20 kHz range, and possibly as high as 40 kHz, and in some cases with 250 Hz spacing. Alternatively, the mobile phones may be specially equipped or have the internal electronics sensitive to frequencies at much higher ranges, such as in the 100 kHz range or higher. As mentioned above, the transducer 545 may, alternatively, be an optical transducer that can sense optical wavelengths that may or may not be in the visible spectrum, for example, in the infrared spectrum.

The transducer converts the signal 503 to a transduced signal 547 that is sent to a receiver 550. The receiver converts the transduced signal 547 into a representation of a signal 551. The representation of the signal 551 may be representations of frequencies, such as 20 kHz, 20.5 kHz and 21 kHz. These representations 551 are sent to a mapping module 555, that may include or access a table of correspondences 516. Based on the data in the table of correspondences 516, the mapping module 555 can report an indication of location 557 within the indoor facility.

The receiver 550 may include special processing to improve performance of the mobile electronics device 510 in determining its location within the indoor facility. For example, the receiver 550 may include a noise reduction module that can use, for example, Fast Fourier Transforms (FFTs) and integration of power spectrum to reduce noise effects, such as fan noise within a room or emitted signals from adjacent rooms. In one case, for example, the processing within the receiver 550 can detect a highest peak within a spectrum under analysis to determine the most likely signal from the emitter in the room. Based on that selection, the mapping module may be presented with data, possibly formed of multiple frequencies, in order to determine the indication of location 557 within the indoor facility.

The receiver 515 may also include a Doppler compensation module 554. As described above, the Doppler compensation module 554 may include processing that compensates for movement of the mobile electronics device to identify more accurately which frequencies have been sensed by the transducer 545. For example, if the mobile electronics device is moving within a room, there may be a sensed frequency shift that causes one frequency to appear to be a higher or lower frequency. If the frequencies that compose the signal within a room are very closely spaced, such as less than 250 Hz, then frequencies may appear to be other frequencies due to the movement. By compensating for Doppler shift, such ambiguities caused by movement can be reduced or eliminated.

It should be understood that other forms of processing may also be used in the receiver 550. Further, it should be understood that raw data from the transducer 545 (i.e., the transduced signals 547) may be transmitted by the wireless device to a server for the processing, such as the noise reduction or Doppler compensation to conserve on battery power of the mobile electronics device.

Figure 6A:
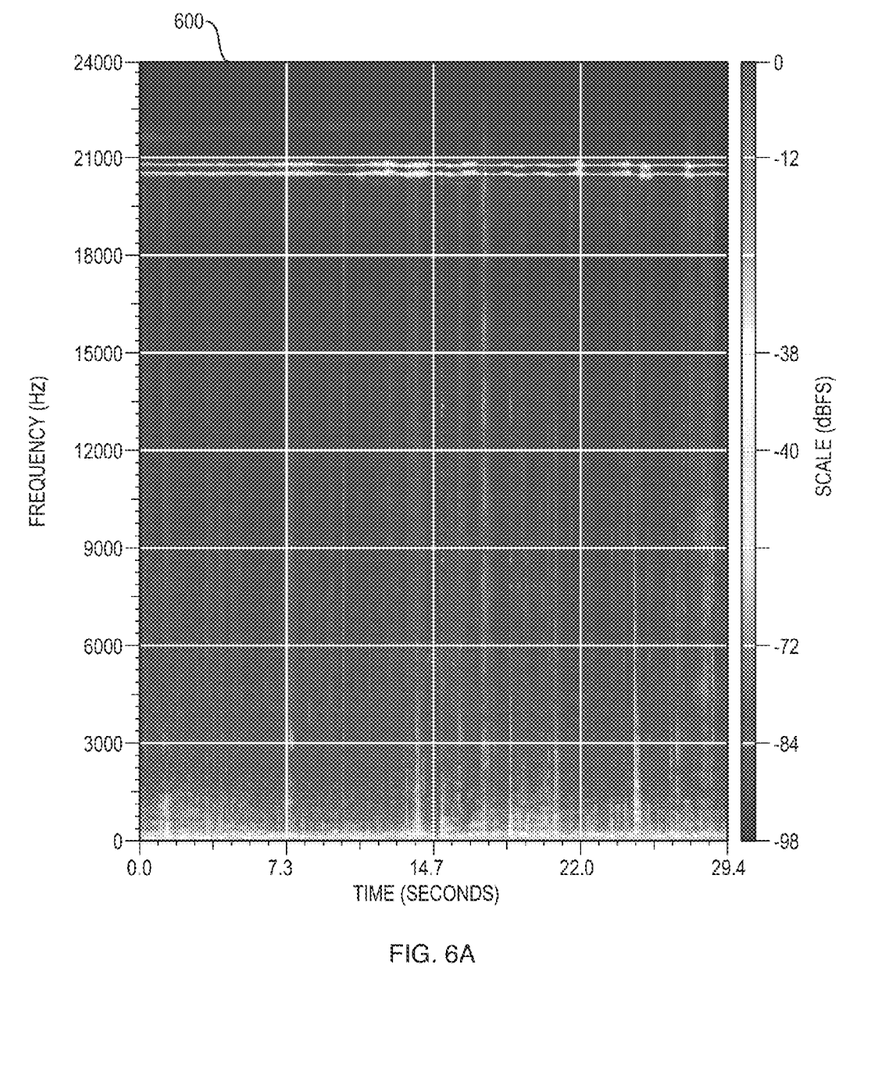
FIG. 6A is a screen capture of signals used within the indoor facility that illustrates a combination of frequencies used to distinguish one location from another location.

FIG. 6A provides an image of a spectrograph of what two tones being played look like as a user walks around a room with an emitting device therein. In the spectrograph, the user with the device started at a greater distance from the sound emitting device (about 30 feet) and walked around the room until the user ended up very close to the sound emitting device. The area where the lines representing the respective frequencies of the signal looks dim is because the signal was weaker due to distance, and the areas where their frequency content looks smeared is the Doppler effect taking place when the user moves quickly. There is no special noise reduction taking place in the spectrograph of FIG. 6A.

Figure 6B:
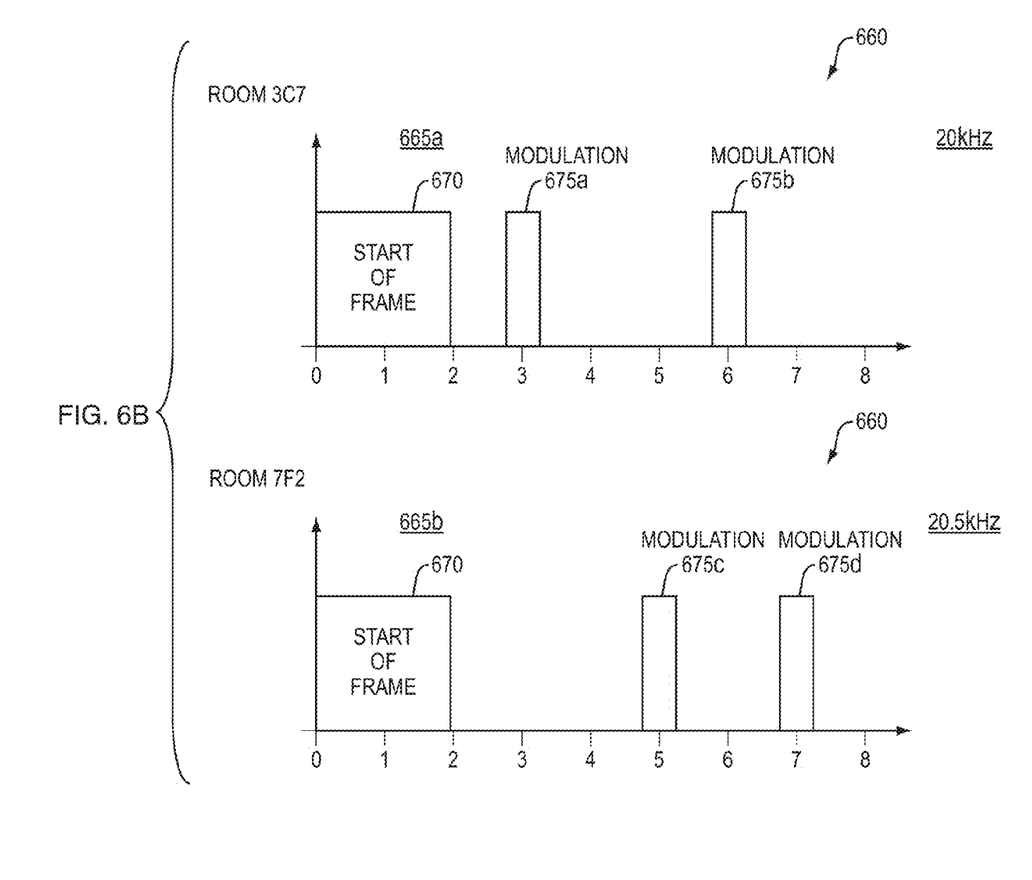
FIG. 6B is a timing diagram that includes two different waveforms that use modulation to distinguish different rooms from each other in the indoor facility.

FIG. 6B is a set of graphs 660 that illustrates an embodiment in which the frequencies are not fixed frequencies, but are frequencies (i.e., carrier waves) modulated in some manner. By using modulation, rather than having many frequencies used to provide distinguishing information for a mobile electronics device to use in determining its location within a building, the system can use fewer frequencies but modulate those frequencies in a manner that can be sensed and received by the mobile electronics device.

The difference between the fixed frequency embodiment and modulation embodiments is that more processing must be performed on both the transmitter and receiver sides for the modulation embodiments. However, if such processing is not a significant cost, such as in terms of processing or power consumption, then the modulation embodiments may be useful to employ, particularly in cases of many rooms within a building. The modulation embodiments may also be effective if emitters cannot support many frequencies, such as eight frequencies within a 2 kHz frequency band at 20 kHz, or emitters that can emit one or two frequencies and do well with modulation.

Continuing to refer to FIG. 6B, a first time chart 665a (for room 367) that modulates a 20 kHz carrier wave is shown. In this example embodiment, there is a start of frame 670 that allows a mobile electronics device to know a beginning to start looking for modulations. Here, the modulations are on-off modulations 675a, 675b. In the example first time chart 665a, the modulations occur at T=3 and T=6. The on-off modulation times can be configured by a facilities manager, or the system can be self-configuring at a system level based on some form of reporting by mobile electronics devices as they move from room to room.

In the second time chart 665b, (for room 7F2), there is similarly a start of frame 670 that is followed in time by on-off modulations 675c, 675d. In this case, the modulations are made to a carrier wavelength of 20.5 kHz.

Again, it should be understood that any form of modulation may be used. The example of FIG. 6B is merely provided as a convenient example.

In accordance with an embodiment of the invention, the signals emitted at multiple fixed locations within an indoor facility can be emitted without any necessary concurrent emitting of wireless network signals. Mobile devices may be localized without any reference to a wireless network. Instead, localization may be based only on the human imperceptible signals, such as ultrasonic signals and/or non-visible optical wavelength signals.

It should be understood that embodiments or aspects of the present invention may be performed in hardware, firmware, or software. For example, the processes associated with performing FFTs, look-up table activities, and other activities described herein, may be performed on mobile electronics devices through use of software. The software may be any form of software that can operate in a manner consistent with the example embodiments described hereinabove. The software can be stored on any non-transient computer-readable medium, such as RAM, ROM, or any magnetic or optical media known in the art. The software can be loaded and executed by a processor to perform operations consistent with embodiments described above.

Presenting an indication of the location of the mobile electronics device can be done in various forms, such as on a display of the device, through audible notification, visual notification, electronic messaging, and so forth. Further, applications such as security guard monitoring (i.e., ensuring rounds are being made), user notification of safe and unsafe rooms or hallways within a building during an emergency, security clearance monitoring (e.g., the electronic device issues an audible tone if the device is carried into a restricted access area), or providing a guided tour, such as in a museum. Once the system has been configured, the applications are plentiful.

While this invention has been particularly shown and described with references to example embodiments thereof, it will be understood by those skilled in the art that various changes in form and details may be made therein without departing from the scope of the invention encompassed by the appended claims.

What is claimed is:

1. A method of providing indoor localization, the method comprising:
    emitting signals at multiple fixed locations within an indoor facility with multiple floors and multiple rooms on each floor, the signals being unique at each location relative to the signals at adjacent locations within the indoor facility, the signals being non-radio frequency signals perceptible by a mobile electronics device, each signal encoded to correspond to both the respective floor and the respective room on each floor within the facility from which each signal is emitted and known to the mobile electronics device by way of a look-up table, the look-up table being a multi-dimensional data structure with dimensions corresponding to the floors and the rooms on each floor within the facility; and
    transmitting the look-up table, on a temporary basis, to the mobile electronics device as the mobile electronics device enters the indoor facility.

2. The method according to claim 1 wherein emitting the signals includes emitting human-imperceptible signals.

3. The method according to claim 2 wherein emitting the human-imperceptible signals includes emitting ultrasonic signals.

4. The method according to claim 2 wherein emitting the human-imperceptible signals includes emitting signals at non-visible optical wavelengths.

5. The method according to claim 1 wherein emitting the signals includes emitting multiple tones at or above 20 kHz separated by at least 250 Hz and at or below 40 kHz at each location within the indoor facility, wherein the combination of tones at each location is different from the combination of tones at each other location.

6. The method according to claim 1 wherein emitting the signals includes emitting a composite of multiple signals of different frequencies without modulation or emitting a composite of multiple signals of different frequencies with modulation on at least one of the frequencies.

7. The method according to claim 1 wherein emitting the signals includes emitting a single frequency having a unique modulation relative to signals at adjacent locations.

8. A system for providing indoor localization, the system comprising:
    a controller configured with a mapping of multiple fixed locations within an indoor facility with multiple floors and multiple rooms on each floor, the mapping including parameters for signals to be emitted at the multiple fixed locations, the parameters being unique for each location relative to parameters at adjacent locations;
    a signal generator at each location configured to generate a signal corresponding to a respective parameter;
    an emitter at each location coupled to the respective signal generator and configured to emit a signal according to the respective parameter, the signals at the multiple fixed locations within the indoor facility being unique at each location relative to signals at adjacent locations within the indoor facility, the signals being non-radio frequency signals perceptible by a mobile electronics device, each signal encoded to correspond to both the respective floor and the respective room on each floor within the facility from which each signal is emitted and known to the mobile electronics device by way of a look-up table, the look-up table being a multidimensional data structure with dimensions corresponding to the floors and the rooms on each floor within the facility; and a mapping distribution module configured to transmit, on a temporary basis, the look-up table to the mobile electronics device as the mobile electronics device enters the indoor facility.

9. The system according to claim 8 wherein the signal generator is configured to cause the emitter to emit human-imperceptible signals.

10. The system according to claim 9 wherein the signal generator is configured to cause the emitter to emit ultrasonic signals.

11. The system according to claim 9 wherein the signal generator is configured to cause the emitter to emit signals at non-visible optical wavelengths.

12. The system according to claim 8 wherein the signal generator is configured to cause the emitter to emit multiple tones at or above 20 kHz separated by at least 250 Hz and at or below 40 kHz at each location within the indoor facility, wherein the combination of tones at each location is different from the combination of tones at each other location.

13. The system according to claim 8 wherein the signal generator is configured to cause the emitter to emit a composite of multiple signals of different frequencies without modulation or emit a composite of multiple signals of different frequencies with modulation on at least one of the frequencies.

14. The system according to claim 8 wherein the signal generator is configured to cause the emitter to emit a single frequency having a unique modulation relative to signals at adjacent locations.

15. The system according to claim 8 wherein the emitter is embedded in a surveillance camera.

* * * * *